United States Patent [19]
Martin et al.

[11] Patent Number: 5,724,046
[45] Date of Patent: Mar. 3, 1998

[54] METHOD AND SYSTEM FOR USING A SINGLE CODE GENERATOR TO PROVIDE MULTI-PHASED INDEPENDENTLY CONTROLLABLE OUTPUTS IN A NAVIGATION SATELLITE RECEIVER

[75] Inventors: Kreg A. Martin; Gary R. Lennen, both of Cupertino, Calif.

[73] Assignee: Trimble Navigation Limited, Sunnyvale, Calif.

[21] Appl. No.: 595,180

[22] Filed: Feb. 1, 1996

[51] Int. Cl.[6] ............... H04B 7/185; G01S 5/02
[52] U.S. Cl. ............... 342/357; 375/200
[58] Field of Search ............... 342/357; 364/449.7; 375/200

[56] References Cited

U.S. PATENT DOCUMENTS

5,293,170  3/1994  Lorenz et al. ............... 342/352
5,402,450  3/1995  Lennen ............... 375/343

Primary Examiner—Theodore M. Blum
Attorney, Agent, or Firm—Thomas E. Schatzel; Law Offices of Thomas E. Schatzel A Prof. Corporation

[57] ABSTRACT

A navigation satellite receiver for demodulating spread spectrum transmissions on pairs of L-band microwave carrier frequency channels, L1 and L2, which use the same pseudorandom number spreading code. A single P(Y)-code generator is used to produce independent P(Y)-code outputs for L1 and L2. The relative P(Y)-code phase between the outputs is adjusted by a phase resolver to account for the dissimilar delays the ionosphere imposes on each of L1 and L2. The phase resolver counts the excess of L1 code clocks over the L2 code clocks with a digital counter and adjusts a digital delay line to compensate.

10 Claims, 6 Drawing Sheets

METHOD AND SYSTEM FOR USING A SINGLE CODE GENERATOR TO PROVIDE MULTI-PHASED INDEPENDENTLY CONTROLLABLE OUTPUTS IN A NAVIGATION SATELLITE RECEIVER

BACKGROUND OF THE INVENTION

1. Field of the Invention

The invention relates generally to radio communication and more specifically to navigation receivers that operate with signals received from orbiting navigation satellites.

2. Description of the Prior Art

The global positioning system (GPS) supported by the United States government enables satellite navigation for military and civilian users alike. Two codes, a coarse-grained acquisition code (C/A-code) and a fine-grained precision code (P-code) are transmitted on two L-band microwave frequencies, e.g., L1 on 1575.42 MHz and L2 on 1227.6 MHz, and each provide ranging and GPS-system time information. The C/A-code is available to civilian users and the P-code is normally encrypted and available only to "authorized" users. Such encrypted P-code is referred to as P(Y)-code. The C/A-code is a digital sequence that repeats each millisecond and is unique to one of two dozen satellites. The P-code is a digital sequence that has a period of 269 days. Each satellite is allocated a one-week long non-overlapping segment of the sequence, which it repeatedly transmits. A single week-long segment is $10.23 \times 10^6 \times 604800$ bits long, which comes from the P-code transmission rate of 10.23 MHz times the exact number of seconds in seven whole days. So a code phase uncertainty of even ±1 second can call for a search through 20,460,000 chips.

Dual frequency receivers have the ability to make ionospheric delay calculations from the fact that the propagation speeds of L1 and L2 differ with varying ionospheric conditions. Such differences are conventionally used to correct ranging information, in order to produce more accurate position fixes, e.g., during day light hours when the ionospheric delays are significant.

Authorized GPS receivers use P(Y)-code generators to recover the P-code. Prior art equipment depends on one P(Y)-code generator for each of the L1 and L2 channels. For example, see U.S. Pat. No. 5,402,450, issued Mar. 28, 1995, to one of the present inventors, Gary R. Lennen. Such Patent is incorporated herein by reference. In FIG. 11 of Lennen '450, separate code clock generators 26 and 128 are described as driving separate local code generators 28 and 126, e.g., separate P(Y)-code generators. But such P(Y)-code generators have proven to be in short supply and expensive.

SUMMARY OF THE PRESENT INVENTION

It is therefore an object of the present invention to provide a navigation receiver for the simultaneous reception of both L1 and L2 carrier frequency transmissions from orbiting satellites.

It is a further object of the present invention to provide a navigation receiver that is simple to construct and reliable in its operation.

It is another object of the present invention to provide a dual-output P(Y)-code generator with independent outputs and based on only one P(Y)-code source per L1/L2 channel pair.

It is another object of the present invention to provide a multi-output P(Y)-code generator with independent outputs and based on only one P(Y)-code source.

Briefly, an embodiment of the present invention comprises a navigation satellite receiver for demodulating spread spectrum transmissions on pairs of L-band microwave carrier frequency channels, L1 and L2, which use the same pseudorandom number spreading code. A single P(Y)-code generator is used to produce independent P(Y)-code outputs for L1 and L2. The relative P(Y)-code phase between the outputs is adjusted by a phase resolver to account for the dissimilar delays the ionosphere imposes on each of L1 and L2. The phase resolver counts the excess of L1 code clocks over the L2 code clocks with a digital counter and adjusts a digital delay line to compensate.

An advantage of the present invention is that a navigation receiver is provided for the simultaneous reception of both L1 and L2 carrier frequency transmissions from orbiting satellites.

Another advantage of the present invention is that a low-cost navigation satellite receiver is provided which is reliable.

A further advantage of the present invention is that a dual-output P(Y)-code generator is provided with independent outputs and based on only one P(Y)-code source per L1/L2 channel pair.

These and other objects and advantages of the present invention will no doubt become obvious to those of ordinary skill in the art after having read the following detailed description of the preferred embodiment which is illustrated in the drawing figures.

DETAILED DESCRIPTION OF THE PREFERRED EMBODIMENT

Figure 1:
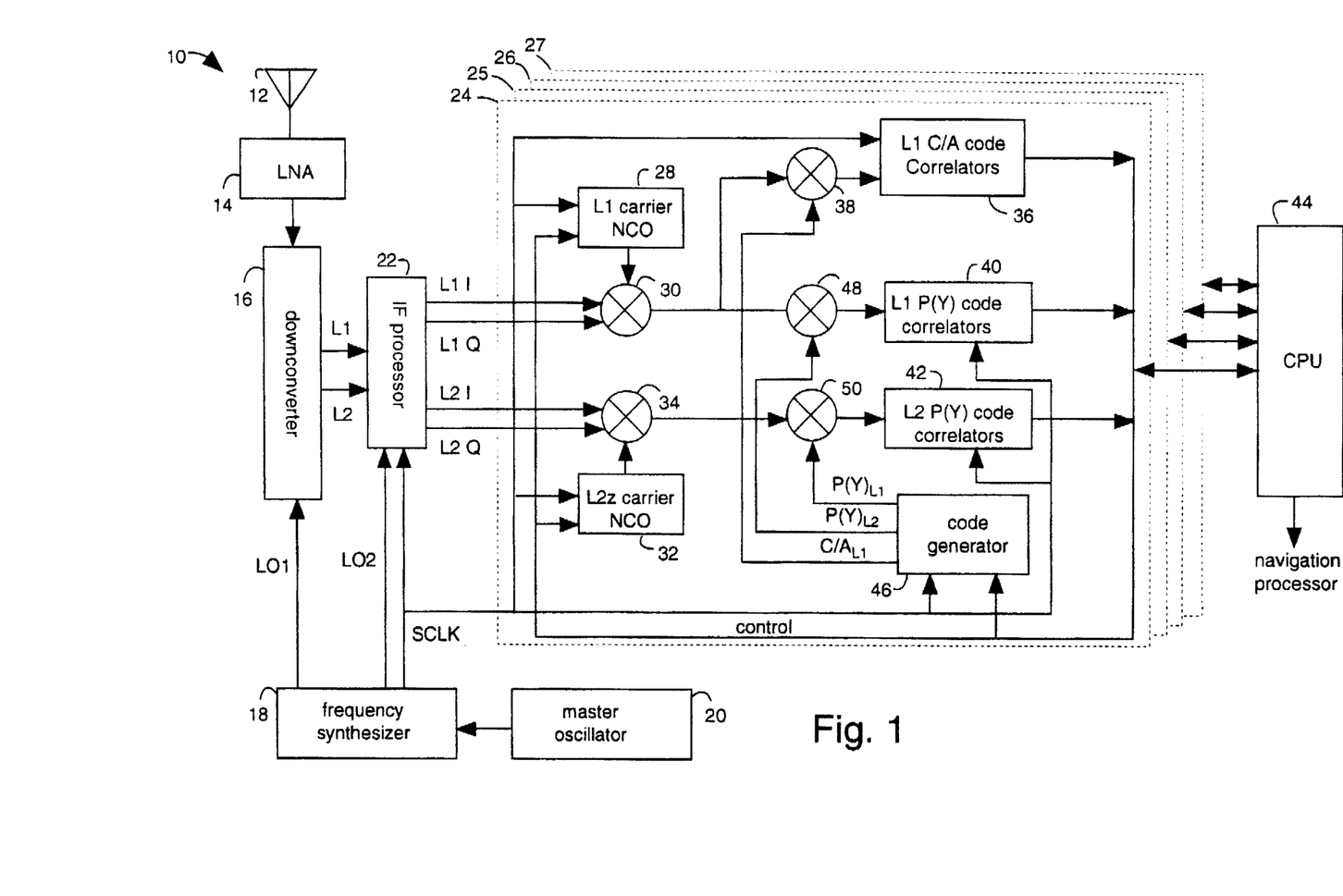
FIG. 1 is a block diagram of a navigation satellite receiver in a first embodiment of the present invention for tracking a plurality L1/L2 channel pairs.

FIG. 1 illustrates a dual-frequency navigation satellite receiver embodiment of the present invention, referred to by the general reference numeral 10. The receiver 10 comprises an L-band microwave patch antenna 12 to receive signals broadcast by orbiting navigation satellites. A low-noise amplifier (LNA) 14 boosts these signals and applies them to a downconverter 16. A frequency synthesizer 18 outputs a sample clock (SCLK) and provides for carrier channel selection and carrier tracking and is clocked by a master oscillator 20. An intermediate frequency (IF) processor 22 provides in-phase (I) and quadrature (Q) signals for each of the L1 and L2 carrier signals to a set of parallel digital channel processors 24–27. The digital channel processor 24 is typical and comprises an L1-carrier numeric controlled oscillator (NCO) 28 that is connected to a mixer 30 that removes the L1 carrier from the L1-signal path. An L2-carrier numeric controlled oscillator (NCO) 32 is connected to a mixer 34 to remove the L2 carrier from the L2-signal path.

Alternatively, carrier removal can occur between the LNA 14 and IF processor 22 by inserting the mixers 30 and 34 with their NCO's 28 and 32, and adjusting the operating frequencies appropriately. Many variations are possible in receiver design that are immaterial to the functioning of the present invention.

A coarse-acquisition (C/A) code correlator 36 provides six observables, early, punctual and late for I and Q L1 C/A code, with the use of a code mixer 38. An L1 precision (P(Y)) code correlator 40 and a L2 precision (P(Y)) code correlator 42 provide six more observables, early, punctual and late (I and Q) for each of P(Y) L1 and L2, to a microprocessor (μP) 44. The observables are used by the μP 44 to control the L1-carrier NCO 28, the L2-carrier NCO 32 and a code generator 46. Specifically, the phases of the L1 and L2 carriers and the phases and codes generated for the C/A and P(Y) codes are controlled. An L1 P(Y)-code mixer 48 and an L2 P(Y)-code mixer 50 respectively remove the P(Y) code for the L1-code correlator 40 and the L2-code correlator 42. The code generator 46 provides the proper code and code phase for the C/A code to the C/A-code mixer 38 and the L1 and L2 P(Y) mixers 48 and 50.

Figure 2:
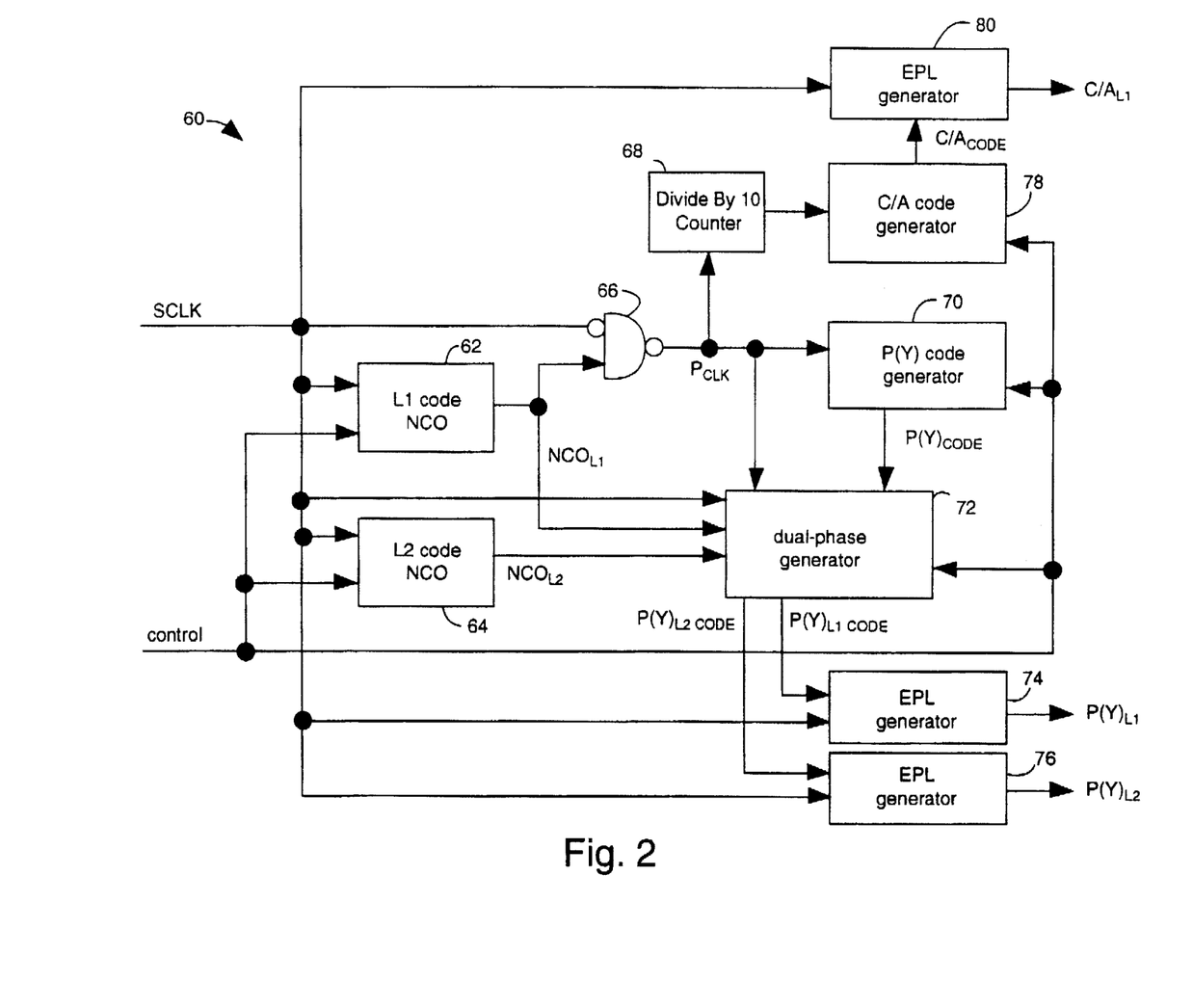
FIG. 2 is a block diagram of a code generator included in the receiver of FIG. 1.

FIG. 2 diagrams a code generator 60 that is similar to the code generator 46 in FIG. 1. Input control and SCLK signals are connected to an L1-code NCO 62 and an L2-code NCO 64. A logic gate 66 is used to produce a precision clock (PCLK) for a divide-by-ten counter 68, a P(Y)-code generator 70 and a dual-phase generator 72. Phase tracking (P)Y-L1 code and (P)Y-L2 code are respectively provided to a pair of early-punctual-late (EPL) generators 74 and 76. The divide-by-ten counter provides a clock to a C/A-code generator 78 and its own EPL generator 80.

The code generator 60 is unique in providing independent-phased P(Y)-L1 code and P(Y)-L2 code, based on a single P(Y) code generator 70, e.g., a Harris Semiconductor AOC chip. The dual-phase generator 72 provides such independent-phased P(Y)-L1 code and P(Y)-L2 code from its one signal input from the P(Y) code generator 70.

Figure 3:
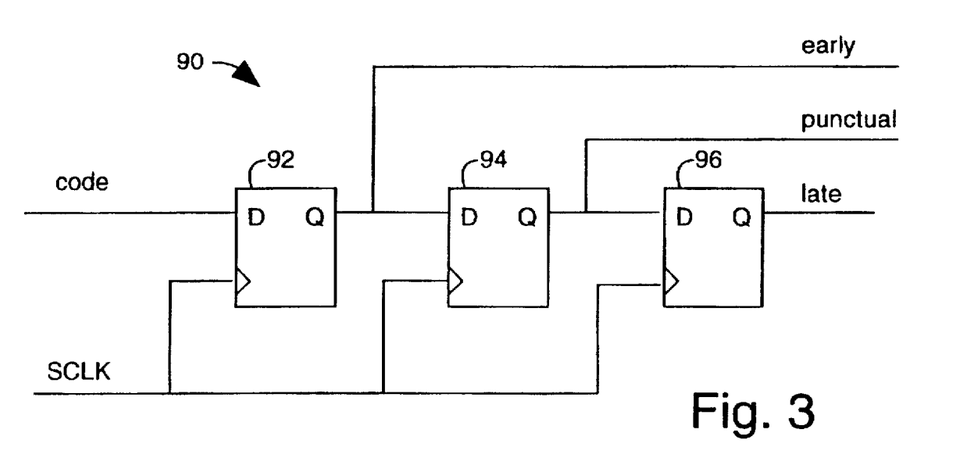
FIG. 3 is a block diagram of an early-punctual-late generator included in the code generator of FIG. 2.

FIG. 3 is a schematic of an EPL generator 90 that is similar to each of the EPL generators 74, 76 and 80 in FIG. 2. The EPL generator 90 is essentially a three-stage shift register clocked by SCLK. A D-type flip-flop 92 provides a version of the spreading code that is one SCLK early in time to the estimated code being tracked. A D-type flip-flop 94 provides a version of the spreading code that is on-time with the estimated code being tracked. A D-type flip-flop 96 provides a version of the spreading code that is one SCLK late in time to the estimated code being tracked. The three versions are used to provide autocorrelation information that assists satellite tracking by the receiver 10.

In operation, the receiver 10 receives signals from the global positioning system (GPS) in which a number of satellites in precise orbits broadcast navigational information. Every satellite in the GPS system broadcasts with the same two L-band microwave carrier frequencies. They are code division multiplexed by individual pseudorandom number (PRN) codes that identify each particular satellite. The C/A-codes comprise patterns of digital ones and zeroes that repeat over fixed time periods relative to the data rate.

In order to boost the weak signals appearing at the antenna 12 without also amplifying the noise, spread spectrum modulation techniques are used which modulates the satellite transmission by the individual satellite identification code. This has the effect of spreading the satellite signal over a bandwidth that is determined by the reciprocal of the pulse width. The receiver 10 multiplies (mixes) the signal received by a replica of the individual satellite code. Such demodulation is generally known as correlation. A particular advantage of using spread spectrum modulation is that it allows the time-of-arrival of the transmitted signals to be determined by the μP 44. The time-of-arrival measurement is an observable that is used to calculate a "Pseudorange" which is the first-cut estimate of the distance between the receiver 10 and a GPS satellite.

Determining the time-of-arrival of a signal requires recognizing at least portions of the incoming signals and then comparing their times-of-arrival with the time that they were known to have been transmitted. Such measurements are made by aligning the incoming codes and the local C/A and P(Y) codes using corresponding code tracking loops. Each code tracking loop adjusts the delay time of one with respect to the other, and minimizes the time difference between the incoming and local codes. Time-of-arrival measurements are then based on the current local code delay time, as measured by the local clock relative to the known time when the incoming signal was transmitted. When such delay times are multiplied by the signal propagation speed, e.g., the speed of light, the pseudorange is determined. But because the local clock is not in perfect synchronism with the transmitter clock, the pseudorange is only a rough estimate of the true range. Anything that disturbs the code tracking loop will also directly affect the time-of-arrival measurements.

Correlation receivers like receiver 10 typically demodulate the downconverted spread spectrum signal by multiplying the incoming signal with locally generated replicas of the spread spectrum code, e.g., mixers 38, 48 and 50. In order to produce measurable signal powers when multiplying the locally generated codes with the incoming signals, the local codes and the incoming codes must be phased within one chip (clock cycle) of each other. When the code phase is within one chip, a measurable signal power will be output that increases as the phase difference of the two codes approaches zero and is called the autocorrelation function. Peak received power is thus detected when the two codes are perfectly aligned in time. The autocorrelation function manifests as a series of correlation spikes that output from matched filter correlator circuits. Optimum demodulation requires keeping the local code phases synchronous with the code phases of the received signals, e.g., to optimize determinations of the signals' times-of-arrival. The latitude, longitude, and altitude of the receiver 10 can be computed from these and the other observables.

Although the P(Y) code applied to each of the L1 and L2 carriers from the same satellite is in synchronism, their respective arrivals at the receiver 10 can be relatively skewed by ionospheric effects that impose different delays on the L1 and L2 carriers because their frequencies are significantly separated in the radio spectrum. For the most part, prior art receivers use independent P(Y) code generators to track the independent L1 and L2 P(Y) codes. Lorenz, et al., describe in U.S. Pat. No. 5,293,170, issued Mar. 8, 1994, the use of adjustable delay-line taps to provide two channels of P-code generation. Such Patent is incorporated herein by reference.

The ideal autocorrelation function between two spread spectrum codes resembles an equilateral triangle. This correlation spike represents the voltage output of a correlating receiver as a function of the relative shift in time between the two correlating codes. Therefore, the maximum voltage at the output of the correlator will be ideally detected when the two codes are in perfect alignment. The actual autocorrelation function in a real receiver is more rounded, e.g., as a sharp partial ellipse.

The incoming spread spectrum signals are mixed to baseband so that quadrature signals (Q), as well as in-phase signals (I), are available at baseband to facilitate carrier tracking. The quadrature and in-phase baseband signals (Q and I) are binary phase-shift key (BPSK) modulated by the spreading code and by any lower modulation rate information that might be included in the satellite transmitted signal. The baseband signals contain the coarse/acquisition (C/A) spreading code with a clock rate of 1.023 MHz and the precision (P) spreading code with a clock rate of 10.23 MHz, together with a fifty baud navigation data bit stream.

Determining the optimum local code delay time requires minimizing some error signal based on the difference between the local code and the incoming code, or maximizing the autocorrelation function (AF). Because the received GPS signals are so weak, a differencing technique involving the use of "early-late" gates is used instead of looking for a maximum output from the autocorrelation function. The ideal, uncorrupted autocorrelation function is symmetrical around its peak, which represents the point in time where the codes are perfectly synchronized.

Typically, measurement of the degree of correlation between the incoming code and the local code is performed at three distinct points on the autocorrelation function. The punctual (P) point, where voltage output is maximized due to perfect alignment of the two codes. The early (E) point, which represents voltage output when the two codes are approaching alignment and are about one sample clock out of alignment, e.g., where the local code is advanced by one sample clock with respect to the incoming code. And, the late (L) point, which represents voltage output when the two codes are receding from alignment, e.g., where the local code is delayed by one sample clock with respect to the incoming code. Only one time offset is used to shift all three correlators synchronously. Thus, the correlator time shifts are not independent of one another.

One early-late gate method measures the autocorrelation function to set a sample voltage level, e.g., at the beginning of the I-bit time interval. The µP 44 keeps track of successive samples. Samples that are two sample clock intervals apart are then subtracted from one another. The later time sample, the "late" gate, is subtracted from the early time sample, the "early" gate. A control function is used to drive the local code chip time delay so that the local code is synchronized with the incoming code. As the early-late gate sampling function progresses in time, the error difference between the early and late voltages diminishes. When such difference goes to zero volts, the optimum autocorrelation function is established. The local code is thus synchronized with the incoming code.

The early-late gate method drives the error voltage to zero, measures the offset in code phase relative to a local clock, and derives an estimate of the time-of-arrival of the incoming signal. The punctual correlator output signal serves as a check on the steering provided by the early-late gate correlators, and in an interference-free environment this signal can confirm the early-late gate derived position of the peak. Nevertheless, the punctual correlator cannot provide any steering information on which way to shift the local code. With no extraneous interfering signals, this early/late gate method works well.

The baseband signals are fed to respective early, punctual, and late mixers which provide early, punctual, and late data for both the in-phase and quadrature signals to the µP 44 for timing calculations. The information is used to generate a tracking signal to close respective code tracking loops. The performance of the code tracking determines the accuracy of the time-of-arrival measurements.

Multipath interference ruins the basic accuracy of correlation receivers. Because multipath signals are replicas of the incoming direct signal and its code, and the principal or primary autocorrelation function is generated by examining the incoming direct signal and the locally generated signal, each multipath signal generates its own secondary autocorrelation function with respect to the locally generated code. The secondary autocorrelation functions always have lower maximum amplitudes than the correlated primary signal, and are always delayed relative to the primary signal. The primary and secondary autocorrelation functions add by superposition to produce a resulting net autocorrelation function. Because multipath signals can subtract from the primary signal, distortions can be induced in the direct signal autocorrelation function. The indicated peak of the composite autocorrelation function may also move in time. Such distortions can translate directly into errors in the steering control or error function for the delay-locked loop, and can result in erroneous estimates of local code phase and pseudorange.

Figure 4:
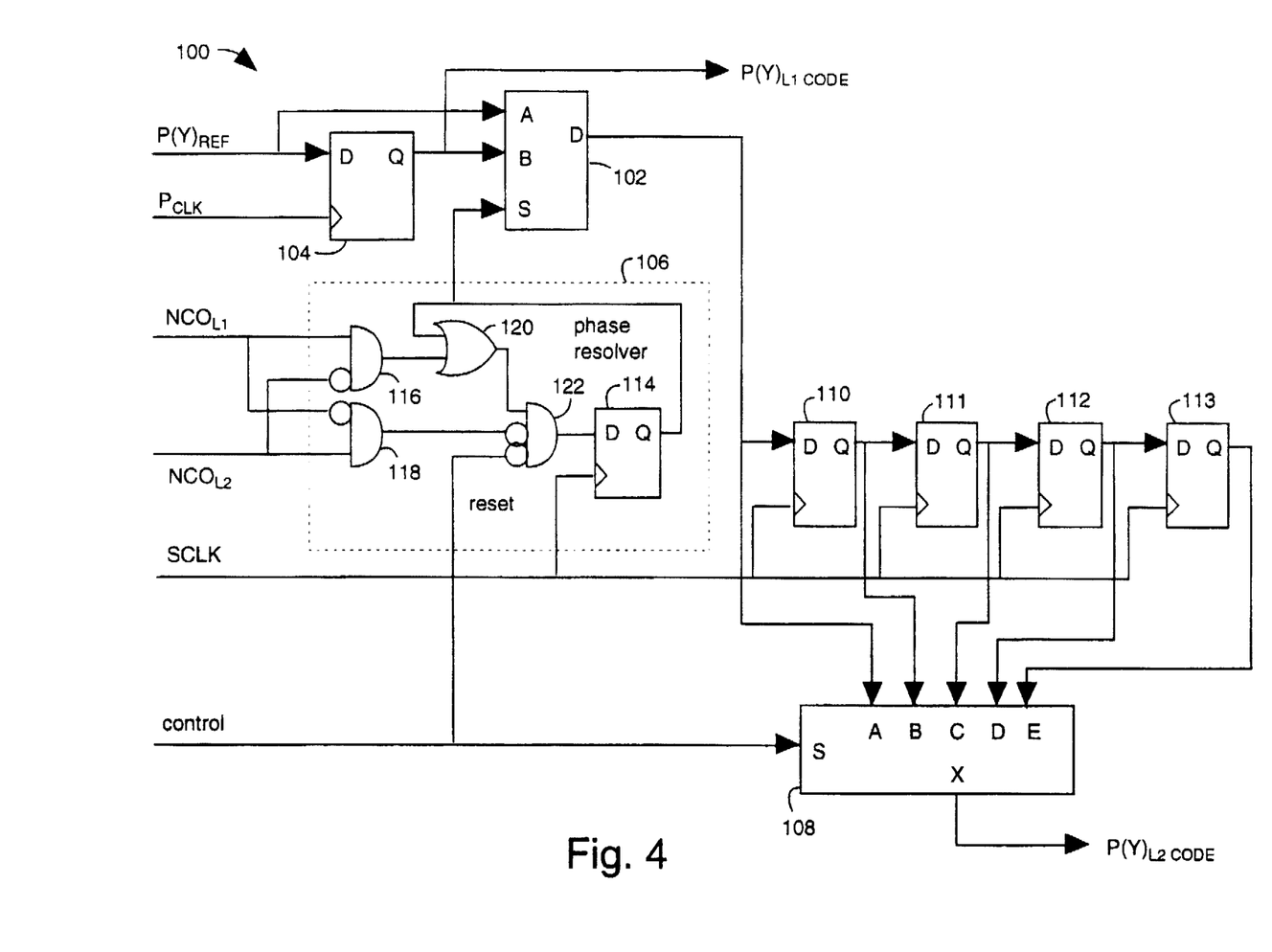
FIG. 4 is a block diagram of a first dual-phase generator of the present invention and included in the code generator of FIG. 2.

In FIG. 4, an independent-phase dual-output P(Y)-code generator 100 is shown that is similar to the dual-phase generator 72 in FIG. 2. The P(Y)-code output from the P(Y)-code generator 70 is applied to the A-input of a two-input data selector 102 and the D-input of a flip-flop 104. The PCLK is used to clock the flip-flop 104 and a second version of the P(Y)-code is connected to the B-input of the data selector 102 that is delayed by one PCLK. The one-PCLK-delayed P(Y)-code is used as the basis for the P(Y)-L1-code output. A phase resolver 106 selects between the non-delayed and delayed A-input and B-input of the data selector 102 according to the relative timing of the L1-NCO output signal and the L2-NCO output signal. The µP 44 maintains a code tracking loop for each of the L1 and L2 P(Y)-code outputs of the dual-phase generator 100. One code tracking loop adjusts the phase and timing of the P(Y)-code IC 70 and the L1 code NCO 62, and the other code tracking loop manipulates a multiplexer 108 connected to a chain of flip-flops 110–113 and adjusts the phase of the L2 code NCO 64, to maintain its lock independent of the first. The number of stages of flip-flops 110–113 used in series to provide an adjustable delay is merely an example of what is possible. As many as twelve stages have been used in practical applications. Other configurations will also give good results.

A phase resolver 106 counts the excess of L1 code clocks over the L2 code clocks with a one bit counter 114. The L1-code NCO 62 provides L1-code clocking through an AND-gate 116. The L2-code NCO 64 provides L2-code clocking through another AND-gate 118. Both code NCO's 62 and 64 clock the one-bit counter 114 through a combination of gates 120 and 122.

The L1-code phase can typically be set to a resolution of 1/2500 of a P-chip. For L2, the phase resolver 106 counts the excess of L1 code clocks over L2 code clocks and uses the multiplexer 102 to select the correct delay. The µP 44 controls the delay selected by the multiplexer 108. The goal is to independently realign the P(Y)-code exactly to the L2-code NCO 64 with a resolution of 1/2500 of a P-chip. For a one-bit counter in the phase resolver 106, the range of this setting is one P-chip. The result is sent through the chained flip-flops 110–113 and on to the L2-correlators. The chained flip-flops 110–113 provide a coarse means of adjustment of the L2-code relative to the L1-code, and have sufficient range to accommodate the worst-case ionospheric delay. For a twelve-stage chain of flip-flops, the coarse adjustment has a range of 4.9 P-chips and a resolution of 0.4092 P-chips.

Figure 5:
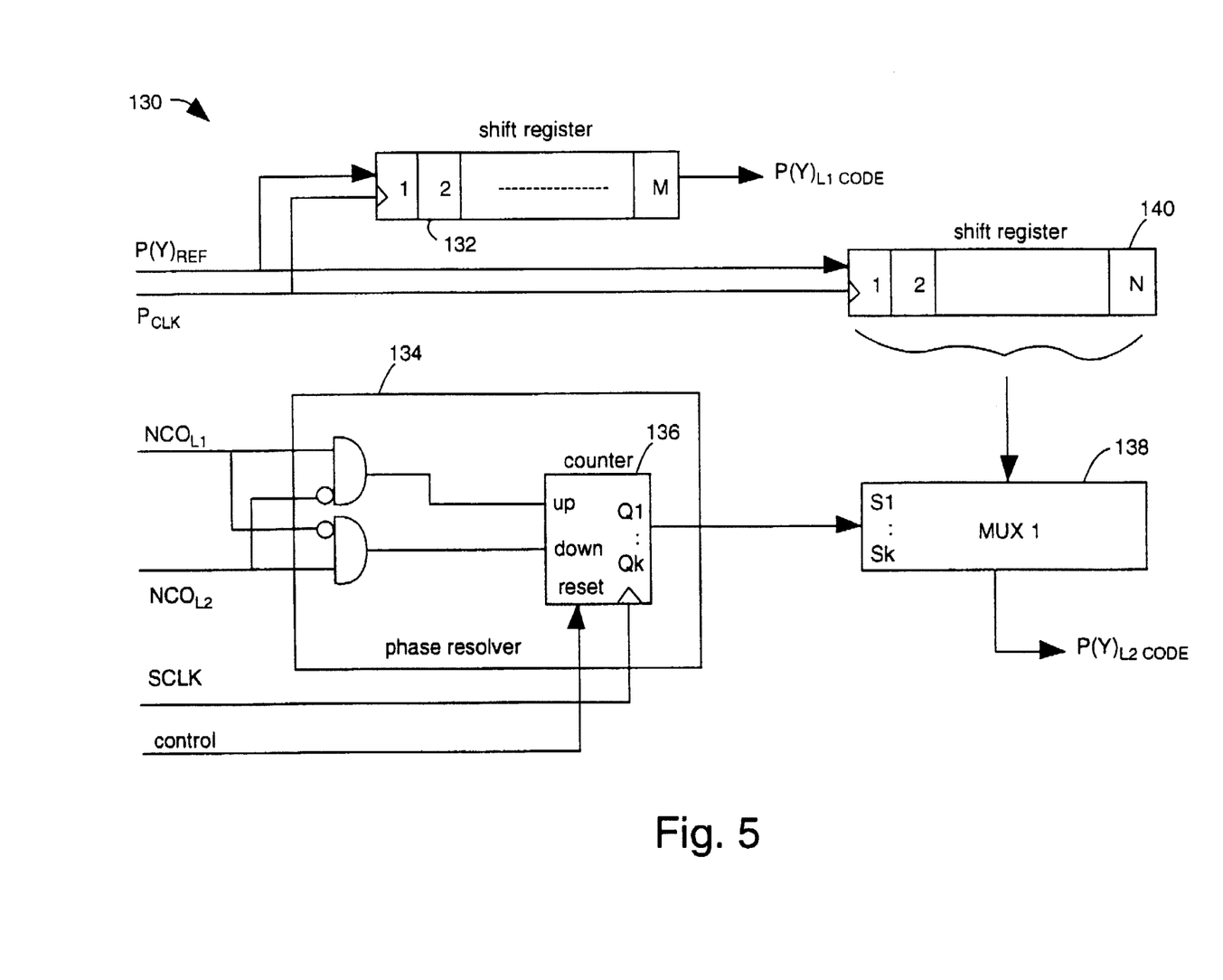
FIG. 5 is a block diagram of a second dual-phase generator of the present invention and that may be included in the code generator of FIG. 2.

FIG. 5 presents an alternative to the circuit of FIG. 4. A dual-output independent-phase P(Y)-code generator 130 provides a wider range of relative phase outputs. An M-length shift register 132 provides m-number of P(Y)-L1 code delays. A phase resolver 134 that includes an up-down counter 136 is connected to an n-wide multiplexer 138 with a corresponding n-length shift register 140.

Figure 6:
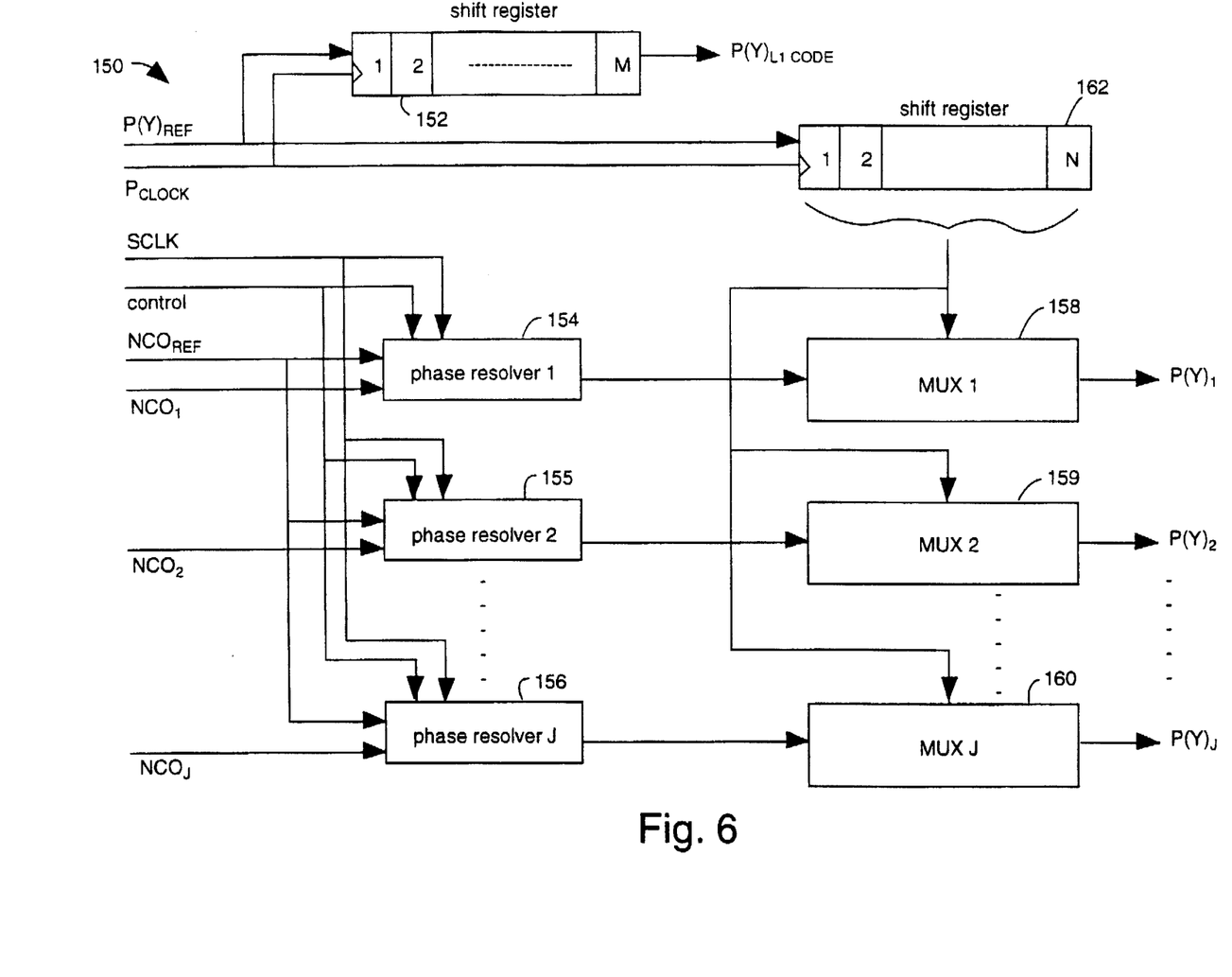
FIG. 6 is a block diagram of a multi-phase generator of the present invention and that could be included in the code generator of FIG. 2.

FIG. 6 presents an alternative to the circuit of FIGS. 4 and 5. A multiple-output independent-phase P(Y)-code generator 150 provides not only a wide range of relative phase outputs and fine resolution, but many independent output phases of P(Y)-code, e.g., $P(Y)_1$, $P(Y)_2$, ..., $P(Y)_J$. An M-length shift register 152 provides M-number of P(Y)-L1 code delays. A plurality of phase resolvers (1, 2, ..., J) 154-156 are connected to an corresponding set of n-wide multiplexers 158-160 driven by a corresponding n-length shift register 162.

FIG. 6 shows a configuration that is capable of providing multiple-independent phase outputs from a single code generator input. Such capability is desirable where multipath reduction is dependent on scanning the autocorrelation function with independently phased local code versions.

Alternatively, the delay adjustment between the L1 and L2 P(Y)-code phases can be accomplished by inserting an adjustable delay line, e.g., clocked by the 20.00 MHz or higher frequency sample clock in front of the carrier NCO mixer, for example, before the mixers 30 or 34 (FIG. 1). No code replica is applied to a delay line. In such a case, the delay line must be many bits wide if the input signal is complex and/or it is quantized to more than two levels.

With regard to FIG. 4, a method of the present invention, e.g., embodied in the phase resolver 106, keeps track of the excess of L1 code clocks over the L2 code clocks. The "Q" output of flip-flop 114 is initialized to zero on reset of both code NCO's 62 and 64, and is set on any L1 code clock with no L2 code clock. It is cleared on any L2 code clock with no L1 code clock. An alignment between the L1 and L2 code phases is maintained as long as the relationship "0≦(L2 code phase)—(L1 code phase)≦one chip". This represents that the L1 and L2 code NCO's 62 and 64 must be initialized together and shifted together.

With regard to FIG. 5, another method of the present invention, e.g., embodied in the phase resolver 134, keeps track of the excess of L1 code clocks over the L2 code clocks. An output signal from the counter 136 is initialized to zero on reset of both code NCO's 62 and 64. The counter 136 increments on any L1 code clock with no L2 code clock, and is decremented on any L2 code clock with no L1 code clock. An alignment between the L1 and L2 code phases is maintained as long as the relationship "0≦(L2 code phase)—(L1 code phase)≦N chips". This represents that the L1 and L2 code NCO's 62 and 64 must be initialized together and shifted together.

Any frequency plan can be used, not just the 25.00 MHz clock mentioned. Such methods can be used also to eliminate the L2 p-coder in a channel pair, or to provide independently positionable correlators with one code source. In the receiver 10 of FIG. 1, it may be advantageous to add more code generator channels and correlators to provide additional correlation points for reducing the effects of multipath interference.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A dual-frequency navigation satellite receiver, comprising:

an antenna and low-noise amplifier for receiving dual-channel spread spectrum transmissions from a plurality of orbiting navigation satellites;

downconversion means connected to the antenna and low-noise amplifier for removing the carriers from an L1 and an L2 channel pair in said transmissions;

a pair of L1 and L2 code mixers connected to the downconversion means for removing a pseudo-random spreading code from said downconverted transmissions;

an L1 code numeric controlled oscillator (NCO) and an L2 code NCO respectively connected to a phase resolver that provides for counting the excess of L1 code clocks over the L2 code clocks with a digital counter;

a single pseudo-random spreading code generator connected to the L1 NCO and providing for an L1 pseudo-random spreading code output signal connected to the L1 code mixer; and digital signal delay means connected to said phase resolver and the single pseudo-random spreading code generator and providing for an L2 pseudo-random spreading code output signal connected to the L2 code mixer, wherein the phase resolver incrementally adjusts the output of the pseudo-random spreading code generator to produce said L2 pseudo-random spreading code output signal.

2. A pseudo-random spreading code generator for a dual-frequency navigation satellite receiver, comprising:

an L1-code oscillator having a clock input connected to receive a sample clock signal and a reset input connected to a reset signal;

an L2-code oscillator having a clock input connected to receive said sample clock signal and a reset input connected to said reset signal;

a phase resolver having a pair of inputs connected to receive outputs from the L1-code and L2-code oscillators and a reset input connected to receive said reset signal, wherein excess of L1 code clocks over the L2 code clocks are counted with a digital counter clocked by said sample clock;

a pseudo-random spreading code generator connected to receive said output of the L1-code oscillator and having an output providing for a spreading code signal;

a serial shift register connected to receive said spreading code signal and connected to shift one stage to the next with said code clocks from said output of the L1-code oscillator, and providing a plurality of parallel outputs;

a multiplexer having a plurality of inputs connected to receive said plurality of parallel outputs from the shift register, and having an output selected by a connection to said digital counter in the phase resolver;

an L1-code output connected to a particular one of said plurality of parallel outputs from the shift register; and an L2-code output connected to said selection output of the multiplexer;

wherein the L1-code output and the L2-code output provide phase independent pseudo-random spreading code signals from the single pseudo-random spreading code generator.

3. A pseudo-random, spreading code generator for a dual-frequency navigation satellite receiver, comprising:

an L1-code oscillator having a clock, input connected to receive a sample clock signal and a reset input connected to a reset signal;

an L2-code oscillator having a clock input connected to receive said sample clock signal and a reset input connected to said reset signal;

a phase resolver having a pair of inputs connected to receive outputs from the L1-code and L2-code oscillators and a reset input connected to receive said reset signal, wherein excess of L1 code clocks over the L2 code clocks are counted with a one-bit digital counter clocked by said sample clock;

a pseudo-random spreading code generator connected to receive said output of the L1-code oscillator and having an output providing for a spreading code signal;

a flip-flop connected to receive said spreading code signal and having a clock input connected to a code clock output of the L1-code oscillator;

a first multiplexer connected to receive said spreading code signal and an output of said flip-flop and connected to select between said inputs according to the state of said one-bit counter in the phase resolver;

a serial shift register connected to receive a selected output of the first multiplexer and connected to shift one stage to the next with said sample clock, and providing a plurality of parallel outputs;

a second multiplexer having a plurality of inputs connected to receive said plurality of parallel outputs from the serial shift register, and having an output selected from one of said parallel inputs;

an L1-code output connected from an output of said flip-flop; and an L2-code output connected to said selection output of the second multiplexer;

wherein the L1-code output and the L2-code output provide phase independent pseudo-random spreading code signals from the single pseudo-random spreading code generator.

4. An improved navigation receiver having an antenna, a downconverter and an intermediate frequency processor for receiving a coarse/acquisition and a precision spreading code on a first L-band microwave carrier frequency (L1) and for receiving said precision spreading code on a second L-band microwave carrier frequency (L2), an L1-carrier local oscillator and mixer for removing the carrier from the L1 baseband signals, an L2-carrier local oscillator and mixer for removing the carrier from the L2 baseband signals, a coarse/acquisition code mixer and correlator, an L1 precision code mixer and correlator, an L2 precision code mixer and correlator, the improvement comprising a code generator connected to each of the three code mixers comprising:

an L1-code oscillator having a clock input connected to receive a sample clock signal and a control signal;

an L2-code oscillator having a clock input connected to receive said sample clock signal and said control signal;

a pseudo-random spreading code generator connected to receive said output of the L1-code oscillator and having an output providing for a first spreading code signal for said L1 precision code mixer and correlator; and a phase resolver connected to control the length of a shift register connected to the pseudo-random spreading code generator and having a pair of inputs connected to receive outputs from the L1-code and L2-code oscillators and said control signal, wherein any excess of L1 code clocks over the L2 code clocks, or vice versa, are used to adjust the length of said shift register and to produce a second spreading code signal for said L2 precision code mixer and correlator.

5. A method for generating independent L1-code and L2-code signals from a single pseudo-random spreading code generator, comprising the steps of:

generating L1-code clocks and L2-code clocks from separate oscillators having a common sample clock input;

phase resolving said L1-code clocks and L2-code clocks from said separate oscillators to count the excess L1-code clocks over the L2-code clocks;

fixing the delay of an L1 pseudo-random spreading code output; and adjusting the delay of an L2 pseudo-random spreading code output to incrementally precede or follow said L1 pseudo-random spreading code output according to said count of excess L1-code clocks over the L2-code clocks.

6. The method of claim 5, wherein:

the step of adjusting is done in increments of pseudo-random spreading code clocks by a connection of a shift register to receive said L1-code clocks.

7. The method of claim 5, wherein:

the step of adjusting is done in increments of sample clocks by a connection of a shift register to receive clocks at least approximately 20.00 MHz.

8. The method of claim 5, wherein:

the step of phase resolving includes counting the excess L1-code clocks over the L2-code clocks with a multiple-bit binary counter connected to select one-of-a-plurality of inputs from a serial shift register provided to support the step of adjusting the delay of an L2 pseudo-random spreading code output.

9. The method of claim 5, further comprising the step of:

providing additional correlation points for reducing multipath interference.

10. A method for generating independent L1-code and L2-code signals from a single pseudo-random spreading code generator, comprising the steps of:

generating L1-code clocks and L2-code clocks from separate oscillators having a common sample clock input and both being initialized by the same reset signal;

phase resolving said L1-code clocks and L2-code clocks from said separate oscillators to count the excess L1-code clocks over the L2-code clocks;

fixing the delay of an L1 pseudo-random spreading code output;

adjusting the delay of an L2 pseudo-random spreading code output to incrementally precede or follow said L1 pseudo-random spreading code output according to said count of excess L1-code clocks over the L2-code clocks;

wherein, the step of adjusting is done in increments of pseudo-random spreading code clocks by a connection of a shift register to receive said L1-code clocks;

wherein, the step of adjusting is done in increments of sample clocks by a connection of a shift register to receive clocks at least approximately 20.00 MHz;

and wherein, the step of phase resolving includes counting the excess L1-code clocks over the L2-code clocks with a multiple-bit binary counter connected to select one-of-a-plurality of inputs from a serial shift register provided to support the step of adjusting the delay of an L2 pseudo-random spreading code output; and providing additional correlation points in an autocorrelation function for reducing the effects of multipath interference.

* * * * *